United States Patent [19]
Cicero

[11] 3,991,516
[45] Nov. 16, 1976

[54] SEPARATING FLOWER POT

[76] Inventor: Edward L. Cicero, 52-62 66th St., Maspeth, N.Y. 11378

[22] Filed: Dec. 17, 1974

[21] Appl. No.: 533,487

[52] U.S. Cl. .............................. 47/34 R; 47/34 S; 47/37; 52/753 K; 217/96; 220/4 B; 220/357; 403/298

[51] Int. Cl.² ...................... A01G 9/02; A01G 9/04; B65D 9/02; B65D 9/32

[58] Field of Search ............... 47/34, 34.1, 34.2, 37, 47/37.2, 37.3, 34 R, 34 S; 24/DIG. 18; 52/403, 586, 753 K; 403/292, 294, 297, 298; 220/358, 4 B, 4 E, 5 R, 298, 357; 217/72, 96

[56] References Cited
UNITED STATES PATENTS

| 129,972 | 7/1872 | Ludlum | 47/37 |
| 402,722 | 5/1889 | Cook | 47/37 |
| 473,836 | 4/1892 | Goodacre | 47/37 |
| 627,681 | 6/1899 | Brooks | 217/96 |
| 726,766 | 4/1903 | Schaefer | 47/37 |
| 2,354,342 | 7/1944 | Walker | 217/96 |
| 2,529,767 | 11/1950 | Gorfin | 220/298 |
| 2,594,307 | 4/1952 | Valenzuela | 47/37 |
| 2,701,659 | 2/1955 | Baltosser | 220/358 |
| 2,735,146 | 2/1956 | Porviance | 403/294 |
| 2,863,185 | 12/1958 | Riedi | 403/297 |
| 3,279,008 | 10/1966 | Wallach | 24/DIG. 18 |
| 3,381,435 | 5/1968 | Smith | 52/403 X |
| 3,383,738 | 5/1968 | Fox et al. | 24/DIG. 18 |
| 3,462,038 | 8/1969 | Morris | 217/72 |

FOREIGN PATENTS OR APPLICATIONS

| 289,885 | 10/1965 | Australia | 47/34.2 |
| 12,905 | 6/1909 | Denmark | 217/96 |
| 586,543 | 3/1925 | France | 47/37 |
| 843,326 | 7/1949 | Germany | 47/38 |
| 801,796 | 12/1950 | Germany | 47/34 |
| 11,461 | 7/1891 | United Kingdom | 47/38 |

Primary Examiner—Edgar S. Burr
Assistant Examiner—Steven A. Bratlie

[57] ABSTRACT

An improved segmented container for potted plants and shrubs of the type defining an inverted conical shape or spherical zone segment which provides greater volume of earth at the base of the container than at the top to encourage greater and healthier root growth. The container assembly consists of a base and two or more separable upper segments which are totally removeable to enable plant withdrawal with minimal damage to the root system or foliage. When assembled the container provides a leakproof, structurally functioning container capable of rapid assembly and disassembly.

9 Claims, 16 Drawing Figures

U.S. Patent  Nov. 16, 1976  3,991,516
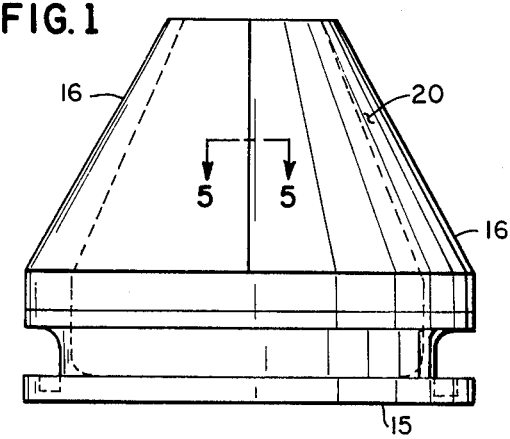
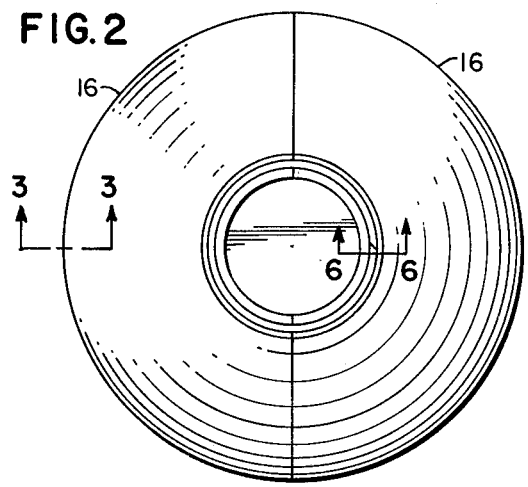
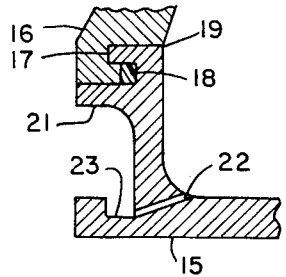
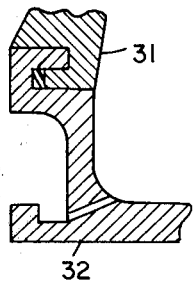
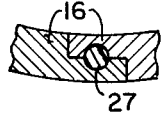
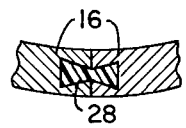
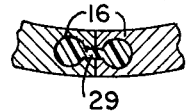
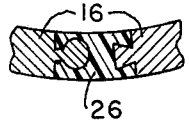
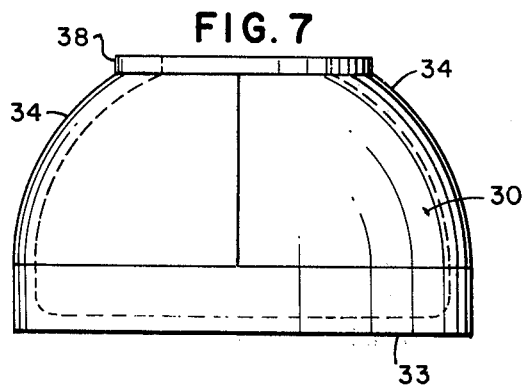
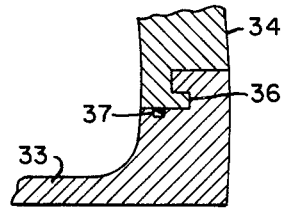
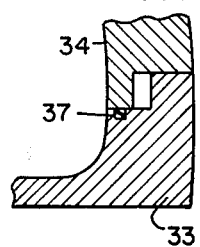
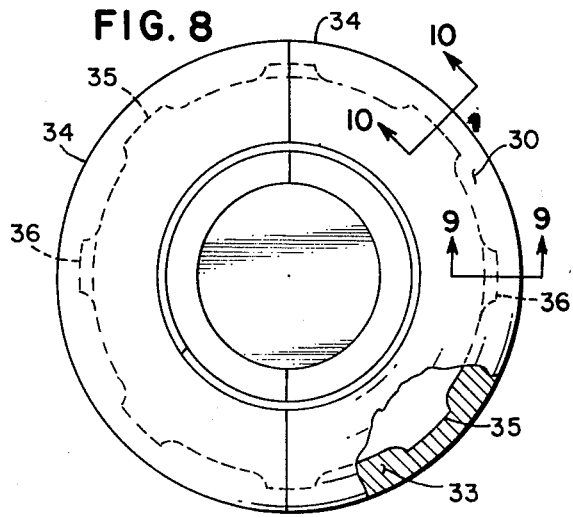
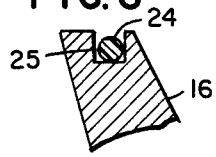
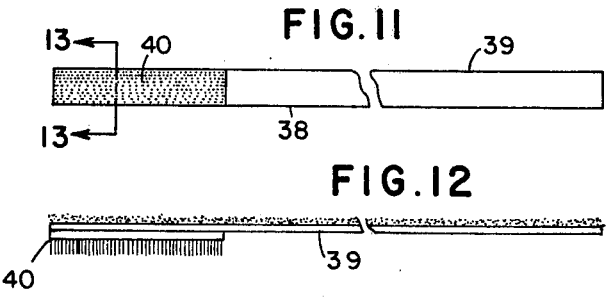
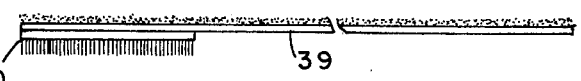

SEPARATING FLOWER POT

BACKGROUND OF THE INVENTION

1. Field of the Invention

This invention relates to segmented containers for potted plants and shrubs in which the bottom volume is greater than at the top or the container exhibits an inverse taper, or trapezoidal cross-section, than is now currently in use.

2. Description of the Prior Art

The common and popular container for potted plants and shrubs is of the type where the top cross section or volume of earth or nutrient is greater than at the bottom . . . i.e., it tapers inwardly from top to bottom. Obviously, this style of container evolved primarily as a consequence of the manufacturing process. The taper provides mould relief which facilitates removal of the cast or moulded pot from the mould. It is acknowledged that plants have survived and have adapted well to these containers, however, from the view of the plant as a viable living item, the smaller constriction at the bottom of the pot is in direct contradiction to the inherent growing mode of the plant in its natural state. The roots of a plant in the free state seek water and nutrition below ground level. They continue to descend and thrive and only seek' the surface under unusual drainage conditions or when the substrate is impenetrable. In conventional pots and shrubs the roots are forced quite soon to seek the greater volume of earth or nutrition which is always towards the top of the container. The root ball soon doubles up on itself and competes against itself for the existing nourishment. Plants survive under this condition but it is quite obvious that they would be even healthier and longer lived if the preponderance of growing room were available as in their free growing state.

The invention of Rothe, U.S. Pat. No. 2,550,602 recognized this problem of root growth and he devised his potted plant container and aeration system which provided an inverse taper so that the base is wider than the top. This was a great first step, but to my knowledge this invention did not enjoy commercial success. To be successful, there must be a container system such as I propose which provides for this preferred shape with easily separable sections of the inversely tapered upper part of the container. This separable container is mandatory in order to remove the plant from the container without damaging the plant foliage or the root ball. This segmented container concept is far superior to current conventional tapered flowerpots which necessitate upending plant and pot and the application of substantial blows on the bottom of the container to lossen and free the plant. This procedure is messy and encourages damage not only to the root ball but to the plant leaves as well. Large house plants such as palms, dieffenbachia, ferns and corn plants and the like which are of substantial height and are potted in quite large and cumbersome pots are very difficult to handle and repot . . . even with two people . . . without damage. Certainly upending plants of substantial weights presents many problems. With the concept of the invention disclosed, this problem would no longer exist for the upper halves of the container would easily be separated by removal of the necessary seals and retainer and the entire root ball exposed on the container base, accessible for removal and repotting.

SUMMARY OF THE INVENTION

The object of the current invention is to provide a segmented container for potted plants and shrubs of the type wherein the container is greater in volume of planting medium contained at the bottom than at the top of the container . . . i.e., a frustum of a right circular cone. The upper inversely tapered segments or sides can be readily dismantled and removed from the base section so that the entire plant or shrub is intact; undamaged in root ball and foliage; and accessible for ease of transplanting or removal.

BRIEF DESCRIPTION OF THE DRAWING

FIG. 1 shows the assembled flower and shrub container in a front elevation view configured in the shape of a frustum of a right circular cone.

FIG. 2 is a top plan view of the configuration shown in FIG. 1 showing the mating upper section shell segments.

FIG. 3 shows a partial sectional view taken along the lines 3—3 of FIG. 2 showing a modified tongue and groove joint attaching upper shells to base section.

FIG. 4 is an alternate method of base to upper securing means similar to FIG. 3 showing a modified tongue and groove joint.

FIG. 5a thru d are various partial sections taken along 5—5 of FIG. 1 showing the alternate methods of vertical splines sealing and retaining the upper container wall segments.

FIG. 6 is a partial section taken along 6—6 of FIG. 2 showing the method of spring wire retention of the upper segments.

FIG. 7 shows a front elevational view of an alternate configuration of the invention utilizing a spherical segment zone.

FIG. 8 is a top plan view of the container shown in FIG. 7 indicating by means of a partial cutting away of the upper segment shells, the recess provided in the base to accept the bayonet attachment means.

FIG. 9 is a partial section taken along 9—9 of FIG. 8 showing the bayonet locking lugs of the container shown in FIG. 7 in the locked position.

FIG. 10 is a partial section taken along 10—10 of FIG. 8 showing the bayonet locking means in the area of the base recess.

FIG. 11 is an elevation view of the circumferential band employing a Velcro fastening system.

FIG. 12 is a top plan view of the band shown in FIG. 11.

FIG. 13 is a sectional view along the lines 13—13 of FIG. 11.

DESCRIPTION OF THE PREFERRED EMBODIMENT

FIGS. 1 & 2 show a flower pot assembly 20 of inversely tapering conical shape . . . i.e., a frustum of a right circular cone. The assembly 20 consists of a base section 15 and two identical separable upper section shell segments 16, which, when properly assembled, provide the upper structural restraining portions of the container. A preferred co-acting base and upper shell configuration is as shown in FIG. 3 wherein the upper shell segments 16, are mated to the base by a horizontal sliding action into a modified tongue and groove as at 17, resulting in inward and upward restraint. A gasket seal as at 18, of suitable elastomeric compounds, provides the base to upper shell segment seal to retain water and planting medium in the completed assembly. The internal mating cicumferential surfaces as at 19, are designed so that a smooth, continuous, faired transition of upper shell and base contour do not entrap particles of planting medium and thereby preclude leakage problems due to misalignment and possible difficult assembly.

The upper container shell segments 16 are secured into position by means of a split ring 24 residing in a machined or moulded groove 25 shown in FIG. 6 at the topmost edge of the container. It is conceiveable that the upper shells could also be secured by one or more external bands as shown at 38 of FIG. 7. Vertical seam seals, 26, shown in FIG. 5a thru d utilize splined seals extending the length from the topmost part of the container shell to the base intersection. These vertical edge seals provide further restraint of the upper shell to body connection and can be designed as in 5d (to be somewhat permanently mounted on one of the faying surfaces while having a capability of being snapped into position on the other surface . . . or a uniform design where they can be snapped onto both mating edges of the upper segments. The seals of 5a thru c, 27, 28, and 29, restrain the shells 16 by utilizing elastomeric or wire reinforced elastomeric spline connectors.

The base 15 is relieved as at 21 which surface serves as a continuous circumferential lifting groove. A number of passages as at 22 around the periphery of the base interior, drain off excess water into a trough 23 providing a positive visual means of adequate and through application of plant nutrient.

FIG. 4 shows an alternative form of the many possible solutions and mechanical equivalents which can be utilized to secure the upper conical shell segments. The shell can be modified as in 31 for insertion into the alternative base assembly 32, from the inside-out direction as contrasted to the outside-in direction of FIG. 1 assembly. The inside-out assembly of FIG. 4 would require slightly modified vertical edge seals fabricated to provide greater sealing width than shown to facilitate assembly of the upper shell passage within the body lip diameter.

The segmented container of this invention could be manufactured in a configuration such as 30, FIG. 7 . . . i.e., a spherical segment zone or a segment of paraboloid of revolution. The base 33 is plain as shown or the external configuration of bases 15 or 32. The main attachment of upper container shell segments 34 is by means of interlocking bayonet rings preferably cast or moulded integrally with the base and the shells having at least two or more engaging locking lugs as at 36. A typical 4 lug 90 degree bayonet system would have base bayonet access cutouts as at 35 accepting upper shell bayonet lugs 36. Locking upper shells to base after insertion into the base as a unit is accomplished by rotating both shells relative to the base approximately 45° to locked position shown in FIG. 9. A gasket or O ring seal 37 provides a leaktight assembly. Installation of upper shell vertical edge seals would be similar to those shown in FIG. 5a thru d . The assembly is completed by securing the band 38 at the topmost part of the container or conceivably elsewhere to achieve distinctive decorative effects. The band may be metal, elastomeric, fabric or the like and contain a quick release securing means. One preferred attachment concept is the use of Velcro type fastening . . . plurality of small gripping hooks . . . for rapid assembly and disassembly. Suitable land or gripping area would be provided to ensure adequate clamping surface.

One possible configuration of the Velcro circumferential band 38 is shown in FIG. 11 where the assembly is composed of a length of Velcro loop tape, 39, extending approximately one and one half times the circumference of the flowerpot. A length of Velcro hook tape, 40, is permanently attached to one end of the loop tape in a back to back relationship. In the assembly with the flowerpot 30, the band assembly 38 is looped around the land provided at the top of the upper shell segments and the band secured by stretching it taut and then pushing the hook tape pad area until secure engagement with the loop face of band 39 is made. Removal is made by a peeling action of the free end of 39 to effect disengagement.

It must be mentioned that many conceivable designs and mechanical attaching means can be devised to accomplish the intent of this invention . . . I have only presented what is considered the most appropriate design approach at this time. The attaching and sealing means shown can be varied and interchanged and the combinations utilized on any of the types of containers. Of course, the container can be fabricated in many materials such as plastic, plastic and structural foams, metal, wood, ceramic, paper mache and the like and the particular design details would have to be compatible with the manufacturing medium. Decorative techniques such as ribbing, grooving, and applied artistic designs including samovar or contemporary type handles could be employed to minimize the existence of the vertical seal seam or joints of the segment of the upper shells.

Having particularly pointed out and described my invention, what I claim is:

1. An improved separating flower and shrub container increasing in diameter from top to bottom, comprising, the combination: a base section having a cavity; two or more mating upper section shell segments; base section to shell segment circumferential sealing means; two or more individual shell segment to shell segment vertical edge sealing means; and one or more circumferential band means to help secure said shell segments; the upper portion of said base section configured for cooperation with the lower configured portion of said mating upper section shell segments to form a tongue and a groove incorporating said circumferential sealing means, thereby resulting in a leakproof and structural restraining tongue and groove joint; each of said upper section shell segment vertical edges being configured to cooperate with an adjacent configured edge and incorporating said vertical edge sealing means, thereby resulting in a leakproof and structural restraining spline joint; the lower portion of each of said upper section shell segments abutting the upper portion of said base section; said base section being externally reduced in diameter from a point below the tongue and groove joint in the upper portion of the base section, and the reduced diameter terminating and partially forming a circumferential recessed trough at the lower portion of the base section; the recessed trough being located below the bottom of the cavity in the base section; a plurality of passages providing communication between the cavity and the trough; and the internal configuration of said cavity substantially mating with the internal configuration formed by the assembled upper section shell segments to present a smooth continuous faired internal configuration.

2. An improved flower and shrub container as in claim 1, wherein assembled said upper shell segments external and internal configuration substantially defines a frustrum of a right circular cone mounted on said base section.

3. An improved flower and shrub container as in claim 1, wherein assembled said upper shell segments external and internal configuration substantially defines a spherical segment zone mounted on said base section.

4. An improved flower and shrub container as in claim 1, wherein the tongue provided on each of said upper section shell segments fit within the groove formed by the upper portion of said base section; said groove in said upper base section directed towards the cavity of the base section.

5. An improved flower and shrub container as in claim 1, wherein the tongue provided on each of said upper section shell segments fit within the groove formed by the upper portion of said base section; said groove in said upper base section directed away from the cavity of the base section.

6. An improved flower and shrub container as in claim 1, wherein said tongue and groove joint incorporating said circumferential sealing means is a bayonet arrangement; each upper section shell segment containing equal numbers of male bayonet locking lugs cooperating with spaced apart female recesses in the upper portion of said base section; the shell segment assembly being locked together with the base female bayonet recesses by rotation of said shell segment assembly relative to said base section to a position of complete male bayonet lug engagement.

7. An improved flower and shrub container as in claim 1, wherein said circumferential band means comprises a Velcro fastening system; said band consisting of a length of Velcro loop tape extending approximately one and one-half times a circumference of said separating flowerpot; said loop tape cooperating with a smaller length of hook tape positioned and fastened at one end of the loop tape.

8. An improved flower and shrub container as in claim 1, wherein said vertical edge sealing means are elastomeric seals substantially circular in cross section; each upper shell segment vertical edge having a semi-circular groove cooperating with an adjacent upper shell segment vertical edge to form a spline joint containing a circular groove the entire length of said shell segment edges to provide a circular housing for a elastomeric seal, whereby a leakproof and structural restraining spline joint is formed.

9. An improved flower and shrub container as in claim 1, wherein said vertical edge sealing means are elastomeric seals mounted on one of the vertical edges of each upper section shell segment and configured to detachably receive the non-seal mounted vertical edge of an adjacent shell segment thereby forming a leakproof and structural restraining spline joint.

* * * * *